US008788761B2

(12) United States Patent
Dally

(10) Patent No.: US 8,788,761 B2
(45) Date of Patent: Jul. 22, 2014

(54) SYSTEM AND METHOD FOR EXPLICITLY MANAGING CACHE COHERENCE

(75) Inventor: William James Dally, Stanford, CA (US)

(73) Assignee: NVIDIA Corporation, Santa Clara, CA (US)

(*) Notice: Subject to any disclaimer, the term of this patent is extended or adjusted under 35 U.S.C. 154(b) by 263 days.

(21) Appl. No.: 13/243,948

(22) Filed: Sep. 23, 2011

(65) Prior Publication Data

US 2012/0079201 A1 Mar. 29, 2012

Related U.S. Application Data

(60) Provisional application No. 61/386,251, filed on Sep. 24, 2010.

(51) Int. Cl.
*G06F 12/08* (2006.01)

(52) U.S. Cl.
CPC ........ *G06F 12/0817* (2013.01); *G06F 12/0842* (2013.01)
USPC ................................. 711/141; 711/E12.026

(58) Field of Classification Search
CPC .................... G06F 12/0817; G06F 12/0842
USPC ............................................ 711/141, E12.026
See application file for complete search history.

(56) References Cited

U.S. PATENT DOCUMENTS

| 7,249,225 | B1 * | 7/2007 | Seidl et al. ................. 711/145 |
|---|---|---|---|
| 2003/0200397 | A1 * | 10/2003 | McAllister et al. ........... 711/141 |
| 2007/0083717 | A1 * | 4/2007 | Rajamony et al. ............. 711/141 |
| 2008/0228871 | A1 * | 9/2008 | Sano ............................. 709/203 |
| 2008/0313410 | A1 * | 12/2008 | Dieffenderfer et al. ....... 711/144 |
| 2009/0157967 | A1 * | 6/2009 | Greiner et al. ................ 711/125 |
| 2009/0172292 | A1 * | 7/2009 | Saha et al. .................... 711/135 |
| 2010/0106912 | A1 * | 4/2010 | Cypher et al. ................ 711/141 |
| 2011/0161588 | A1 * | 6/2011 | Guthrie et al. ................ 711/122 |
| 2012/0042133 | A1 * | 2/2012 | Takeda et al. ................. 711/143 |

* cited by examiner

*Primary Examiner* — Hal Schnee
(74) *Attorney, Agent, or Firm* — Zilka-Kotab, PC

(57) ABSTRACT

One embodiment of the present invention sets forth am extension to a cache coherence protocol with two explicit control states, P (private), and R (read-only), that provide explicit program control of cache lines for which the program logic can guarantee correct behavior. In the private state, only the owner of a cache line can access the cache line for read or write operations. In the read-only state, only read operations can be performed on the cache line, thereby disallowing write operations to be performed.

18 Claims, 11 Drawing Sheets

SYSTEM AND METHOD FOR EXPLICITLY MANAGING CACHE COHERENCE

CROSS-REFERENCE TO RELATED APPLICATIONS

This application claims benefit of United States provisional patent application entitled "Co-Operative Coherence: A Method and Apparatus for Explicitly Managing Cache Coherence," filed on Sep. 24, 2010 and having a Ser. No. 61/386,251.

BACKGROUND OF THE INVENTION

1. Field of the Invention

The present invention generally relates to caching architectures and, more specifically, to a system and method for explicitly managing cache coherence.

2. Description of the Related Art

Most modern microprocessors include some form of instruction and data caching, where a small but fast cache memory speeds up access to a main memory. At the simplest level, a cache memory can pre-load blocks of memory from main memory so that the processor need not stall when performing a load. This is possible because (a) a processor usually accesses sequential memory locations and (b) loading more than one sequential memory location at the same time is faster than loading each sequential memory location one by one.

In a multi-processor environment, two or more processors may share access to the same area of main memory via corresponding cache memories. Such sharing could lead to cache corruption. For example, processor P may store cache lines of data associated with the particular area in a corresponding cache memory, including any changes that may have been made to the data. Processor Q may then load a cache line associated with the particular area from the main memory. Because the first processor stores a (possibly modified) copy of the data in the corresponding cache memory, the data loaded by the second processor may not be the most current data. Such a scenario may lead to cache corruption.

To avoid cache corruption in a multi-processor environment, a cache coherence protocol is often implemented to provide a coherent shared memory for multiple processors. As a result of a cache coherence protocol, at any point in time, processor P reading memory location A sees the most recently completed write to location A made by any other processor. To implement such cache coherence, if P makes a copy of A in its local cache memory, then the copy must be updated or invalidated when another processor Q writes location A. The implementation of cache coherence protocols comes at considerable cost. Simple read and write operations can spawn three or more messages to update directory state, invalidate stale copies, and provide acknowledgements. The transmission and tracking of such messages is not only cumbersome but also negatively impacts the performance of the system.

Accordingly, what is needed in the art is a system and method for implementing cache coherency without imposing a large messaging overhead on the system.

SUMMARY OF THE INVENTION

A method for implementing cache coherency across a plurality of cache units coupled to a random access memory unit. The method includes the steps of receiving a request for setting a state corresponding to one or more cache line in a set of cache lines to an explicit control state, and setting the state corresponding to every cache line included in the set of cache lines to the explicit control state, wherein, when the state corresponding to a first cache line in the set of cache lines is set to an explicit control state, only a pre-determined set of memory access operations can be performed on the first cache line and any memory access operations performed on the first cache line are not tracked by a global directory associated with the plurality of cache units.

Advantageously, allowing elements to be in an explicit control state—a read only or a private state—reduces the amount of invalidate and acknowledge messages that are needed to maintain coherency in a multi-processor caching environment. Such a reduction increases the overall performance of the system and reduces the complexity of the cache coherence protocol.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
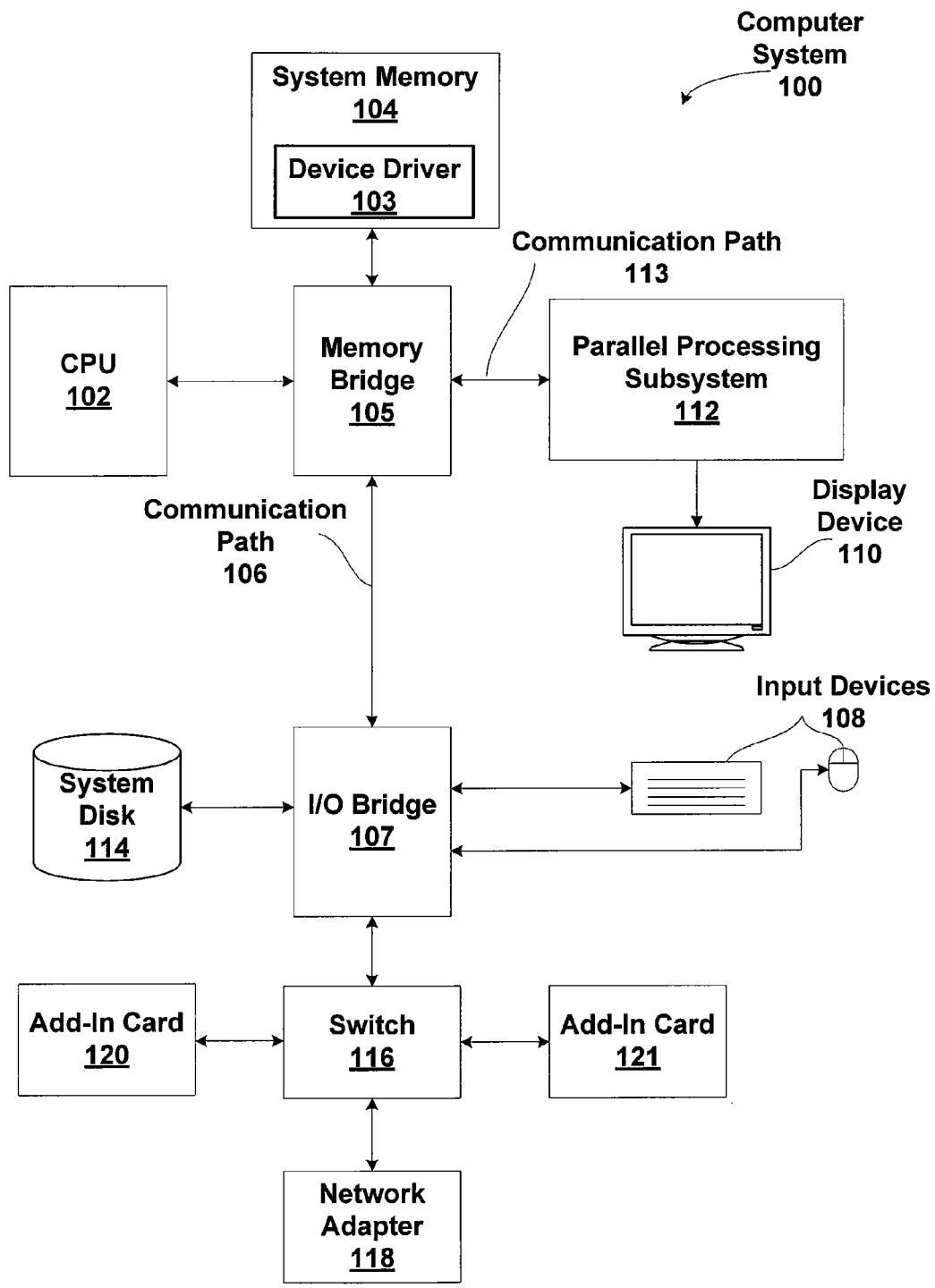
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
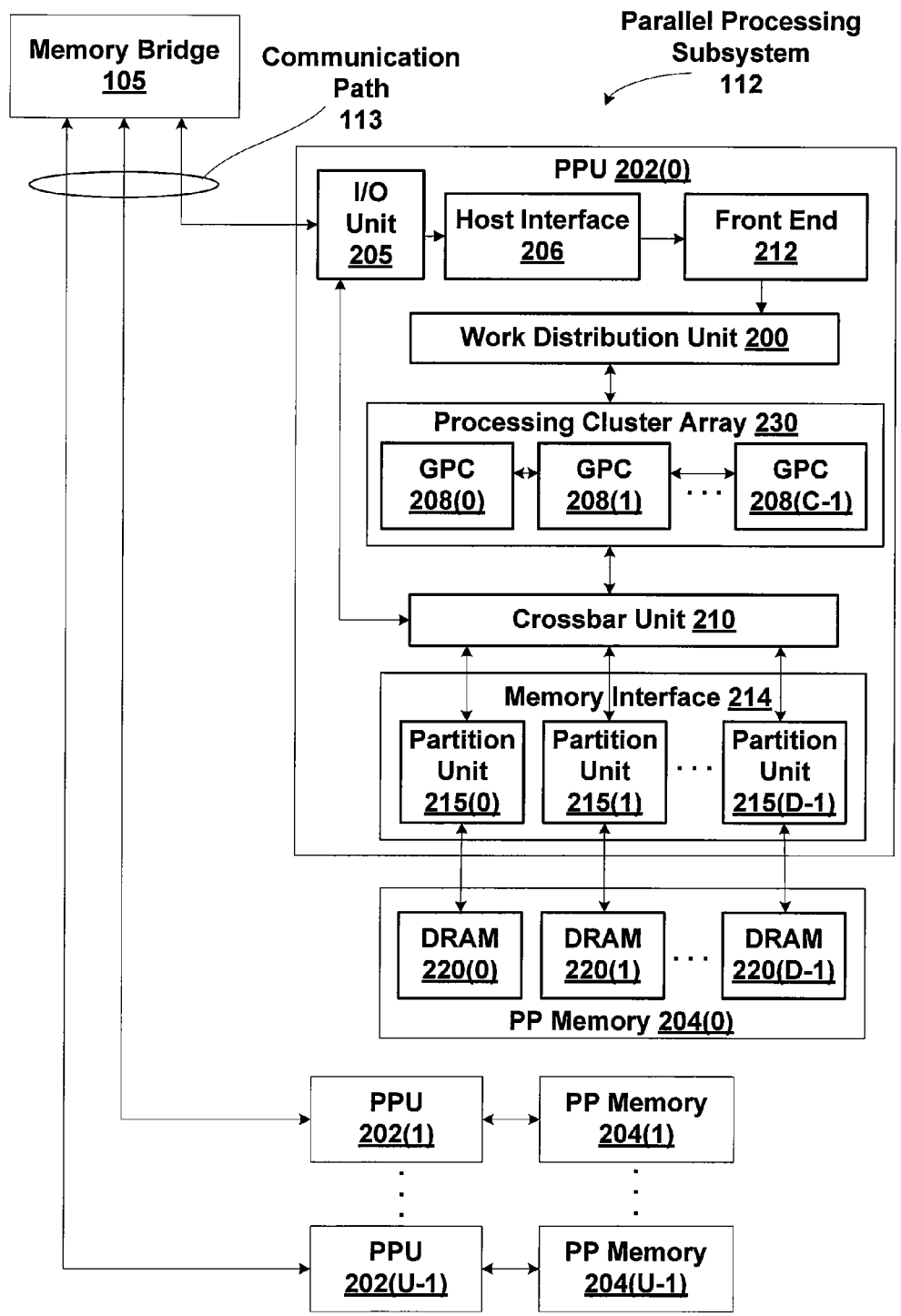
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
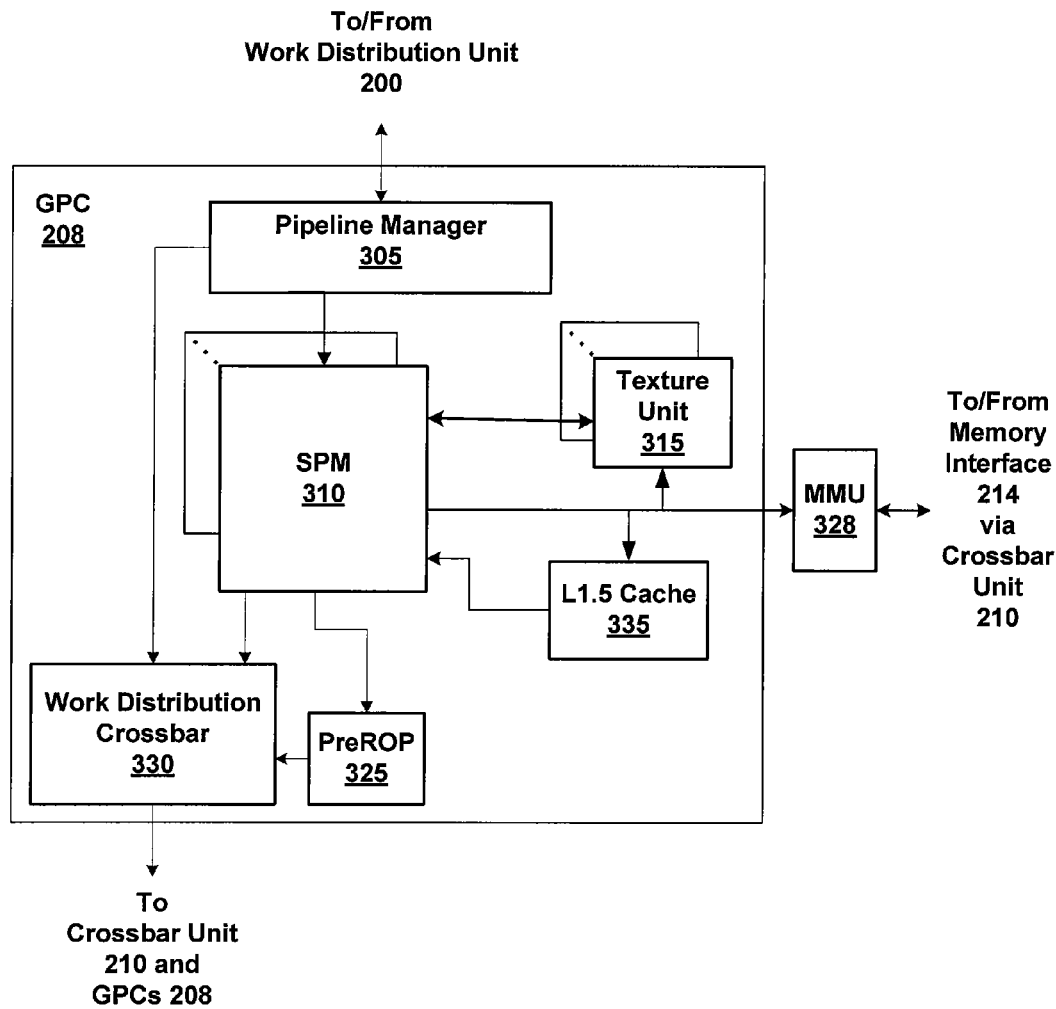
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
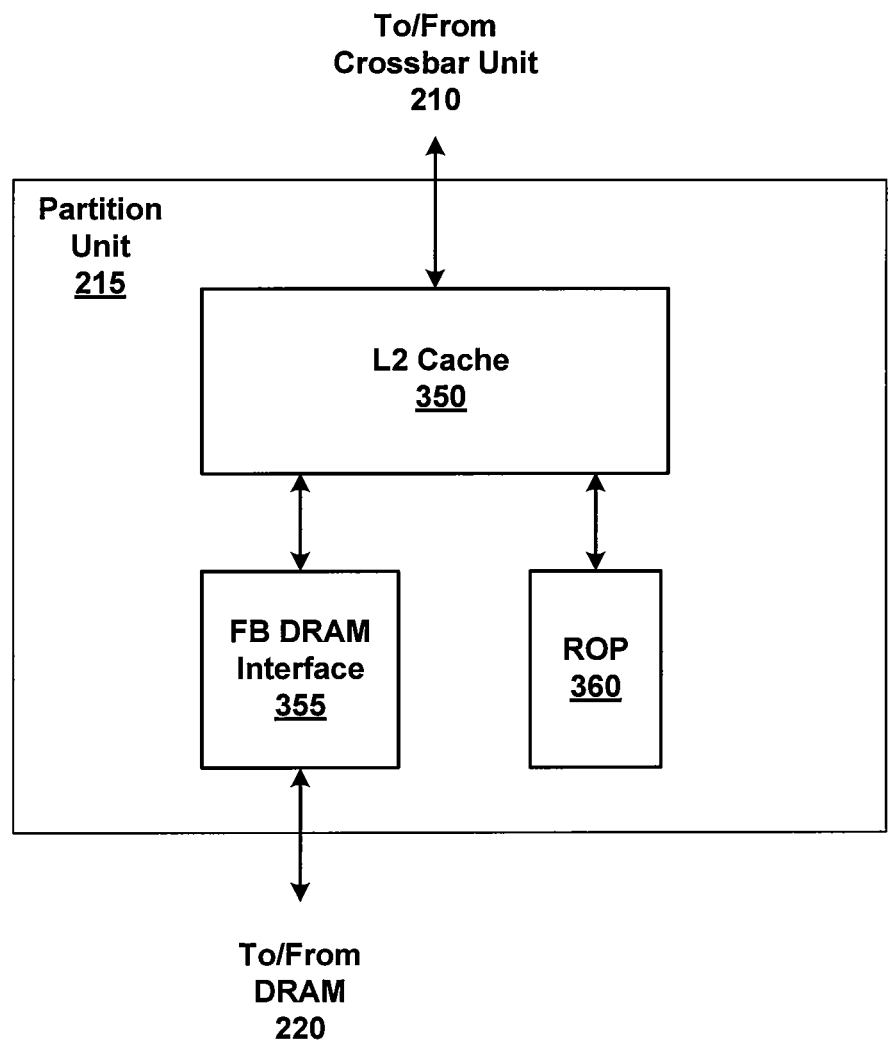
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
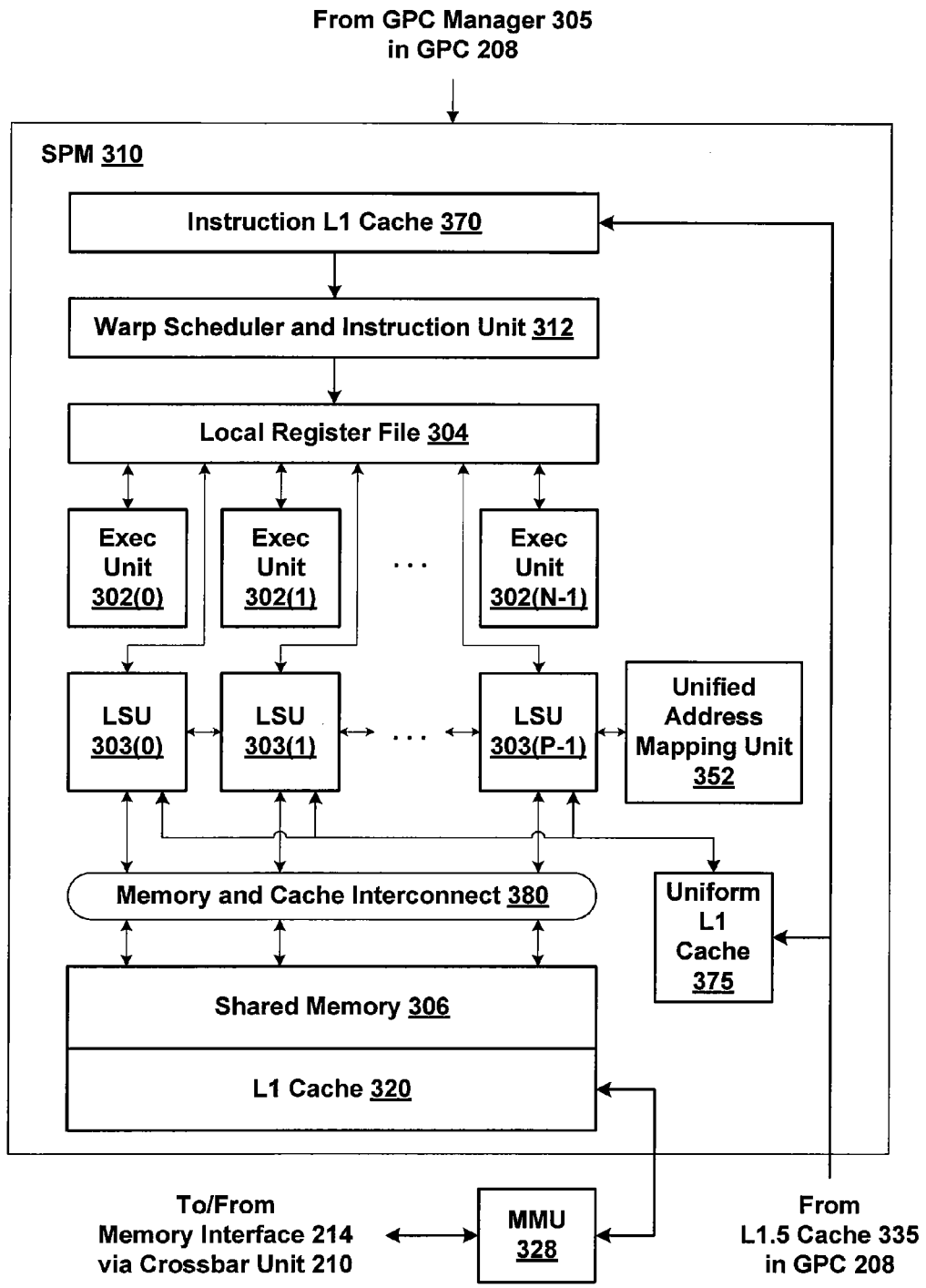
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Explicit Control State for Cache Lines

The present invention describes an extension to a cache coherence protocol with two explicit control states, P (private), and R (read-only), that provide explicit program control of cache lines for which the program logic can guarantee correct behavior. The explicit control states are integrated into a conventional cache coherence protocol so automatic coherence is provided for cache lines not under explicit control and so individual lines can be easily switched from explicit control to automatic control.

Consider the following code fragment that is typical of many simulation programs:

```
struct cell acells[MAXCELLS] @ block(0,nrnodes[0]−1)
private struct cell pcells(acells) ;
read_only struct cell rcells(acells) ;
for each timestep {
    barrier( ) ;
    update_cells(pcells) ;
    // each cell is guaranteed to be accessed by only one thread
    release(pcells) ; // update main memory with updated version
    barrier( ) ;
    compute_with_sharing(rcells) ; // share cells read-only in caches
    flush(rcells) ;          // flush read-only copies
}
```

The array acells is accessed via two views: pcells and rcells. Once each time step, each array element is updated via its pcell view. The first thread to access an element via the pcell view makes a private copy in its cache where the private copy can be accessed and updated. No other accesses to the element are allowed until the private copy is released. The private state differs from an exclusive or modified state in that it prohibits accesses by other caches, hence simplifying the protocol and detecting potential races.

After the private state is released, other threads access the updated element via the rcells view. The rcells view accesses the line in the read-only state. In the read-only state, only read accesses are allowed and sharers are not tracked by the cache global directory—simplifying the protocol by eliminating the need for invalidate messages and the corresponding acknowledgements. An attempt to write an element in the read-only state (or request an exclusive copy of the element) results in an error condition. When the rcells are flushed, the elements are returned to an idle state.

Figure 4:
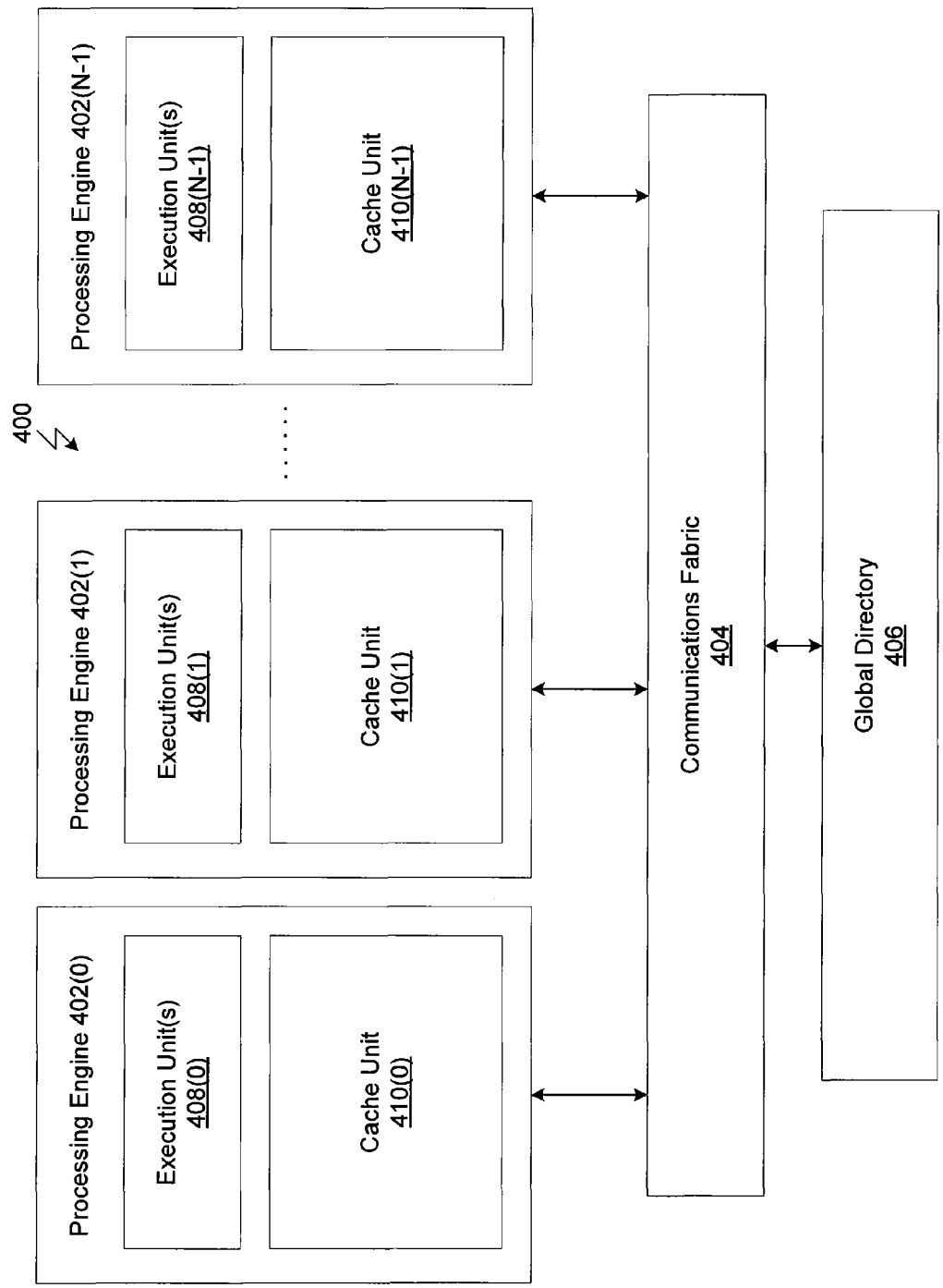
FIG. 4 is a block diagram of a multi-processor cache architecture, according to one embodiment of the invention.

FIG. 4 is a block diagram of a multi-processor cache architecture 400, according to one embodiment of the invention. As shown, the multi-processor cache architecture 400 includes processing engines 402, a communication fabric 404 and a global directory 406. The processing engines 402 are coupled to each other and the global directory 406 via the communication fabric 404.

Each processing engine 402 includes one or more execution units 408 for executing instructions and a cache unit 410 for storing data. The execution units 408 access data stored in the corresponding cache unit 410 included in the processing engine 402. The cache unit 410 locally stores one or more cache lines of data loaded from an off-chip memory, such as a DRAM, and needed by the execution units 408. The execution units 408 perform read and write operations on the data stored in the cache unit 410. Modifications made to the data are either invalidated based on certain conditions or are evicted to the off-chip memory.

In one embodiment, each processing engine 402 corresponds to an SPM 310, the execution units 408 correspond to the exec units 302 and the cache unit 410 corresponds to the L1 cache 320 previously described herein.

Because the multiple cache units 410 across the different processing engines 402 share the off-chip memory, cache coherency is needed to avoid cache corruption. The global directory 406 maintains coherence between caches. The global directory 406 acts as a filter through which the cache units 410 ask permission to load data from the off-chip memory or write data to the off-chip memory. In operation, the global directory 406 tracks the directory state of each cache line associated with the off-chip memory with respect to the cache units 410. Based on the directory state corresponding to a cache line, the global directory 406 determines whether particular actions initiated at the different cache units 410 can be performed on the cache line. Further, when necessary, the global directory 406 indicates to the other cache units 410 the new state of the cache line after an action has been performed on the cache line. The details of the operations performed by the global directory 406 are described below with respect to Table 3, Table 4 and FIG. 7. The global directory may be in a single location or distributed across multiple locations.

Figure 5:
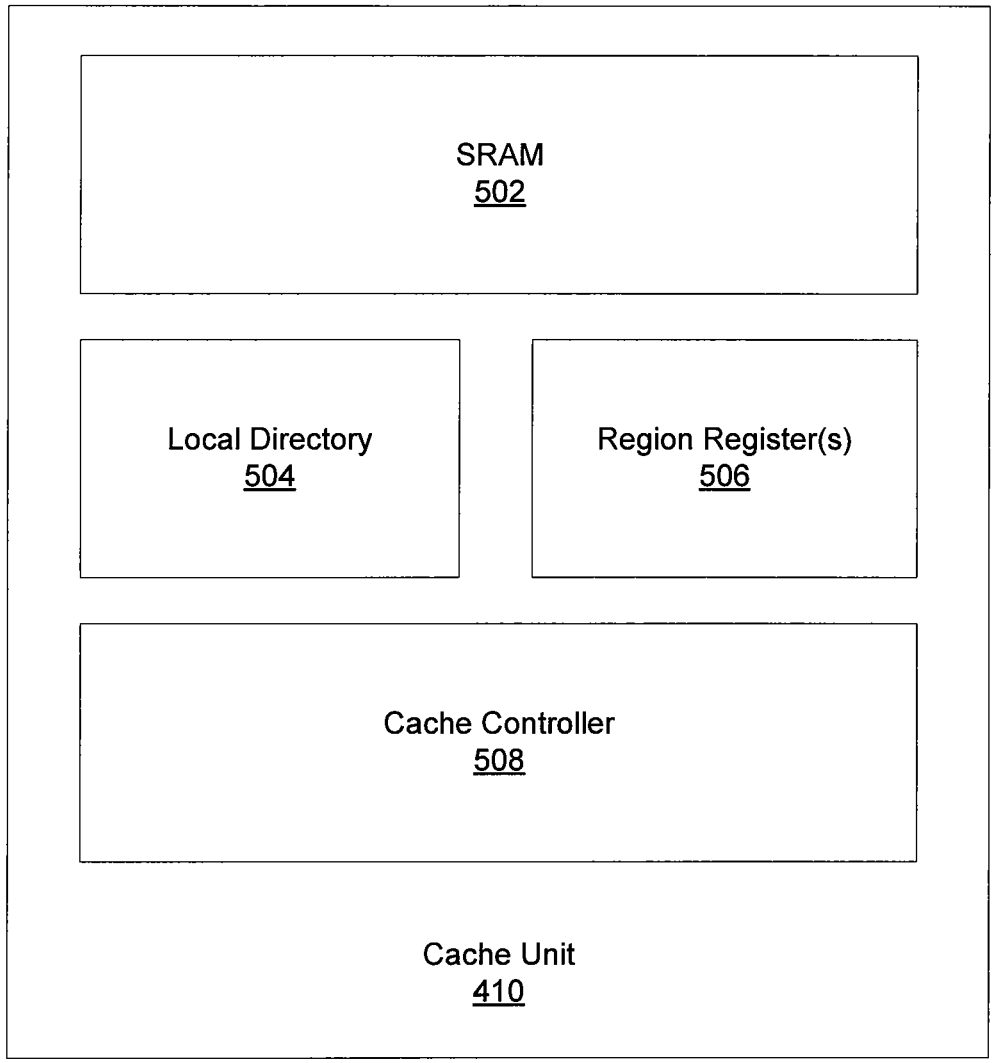
FIG. 5 is a more detailed illustration of the cache unit of FIG. 4, according to one embodiment of the invention.

FIG. 5 is a more detailed illustration of the cache unit 410 of FIG. 4, according to one embodiment of the invention. As shown, the cache unit 410 includes a static random access memory (SRAM) 502, a local directory 504, region register (s) 506 and a cache controller 508.

The SRAM 502 stores the data associated with different cache lines loaded from the off-chip memory. The data stored in the SRAM 502 can be modified by the execution units 408 and can be evicted to the off-chip memory as necessary. The local directory 504 stores the state corresponding to each cache line stored in the SRAM 502. A cache line can have one of the following five states:

Modified (M): Indicates that the cache line has been modified from the value in the off-chip memory.

Shared (S): Indicates that the cache line is stored in multiple cache units 410 and matches the value in the off-chip memory.

Invalid (I): Indicates that the cache line is invalid.

Private (P): Indicates that the cache line is owned by a particular cache unit 410 and cannot be accessed by any other cache unit 410.

Read-Only (R): Indicates that the cache line can only be read by the cache units 410 and cannot be modified (written).

In addition to the above-mentioned states, a "pending" bit in the local directory 504 indicates when the current state is pending. Thus, the state "PP" indicates that the cache line state transition to private is pending. An action arriving in a pending state is either merged with the pending action or deferred. Further, the protocol can easily be extended to include an exclusive (E) state, where a cache has an exclusive copy but the line has not yet been modified.

In one embodiment, region registers 506 are used to indicate that a load or store to a given range of addresses should request a line in the read-only (R) or private (P) state. For example, if a region register indicates a region is read-only, loads to that region should request lines in the R state. In an alternative embodiment, an alternative to region registers is to layer the type of load or store request on a page-based memory management system by adding the state (R, P, or N) to a page table entry.

The cache controller 508 receives requests to perform different actions on a particular cache line or a group of cache lines. The requests include memory access requests, such as read (R), write (W) and evict (E). The requests also include state change requests received from a software program, such as make private (MP), release private (RP), make read-only (MR) and release read-only (RR). The requests also include state change requests received from the global directory caused by other state changes initiated at the different cache units 410. Such requests include invalidate (I) or write back (WB).

Table 1 describes the local cache state transitions implemented by the controller 508 in response to the requests enumerated above. For example, if a cache line is in state "S" and the cache controller 508 receives a write request, the cache line transitions to the state "M." In some scenarios, a state transition necessitates the transmission of a request to the global directory 406. The request transmitted to the global directory 406 at a state transition is indicated in Table 1 below in brackets. For example, when the cache line transitions from the state "S" to the state "M" in response to a write request, the cache controller 508 transmits a request modified (RM) request to the global directory 406.

TABLE 1

| Re-quest | Current State | | | | |
|---|---|---|---|---|---|
| | I | S | M | P | R |
| R | S/R (RS) Line is pending shared until reply from directory. Reply may set line to S or R. | S Read satisfied locally. | M Read satisfied locally. | P Read satisfied locally. | R Read satisfied locally. |
| W | M/P (RM) Line is pending modified until reply from directory. Reply may set line to M or P. | M (RM) Line is pending modified until reply. | M Write satisfied locally. | P Write satisfied locally. | N/A Not allowed. |
| E | N/A | I (E) Line goes invalid, directory notified. | I (WB) Write back and notify directory. | I (WB) Write back state, line is still private in directory. | I Silent evict. |
| MP | P (Optional: RP) Line is pending private until reply from directory. | P (Optional: RP) Line is pending private until reply. | P (Optional: RP) Line is pending private until reply, no need to write back. | N/A Redundant. | P (Optional: RP) Line is pending private until reply. |
| RP | I (Optional: RRP) Notify directory. | N/A | N/A | I (WB) Line goes invalid, write back if dirty. | N/A |
| MR | R (Optional: RR) Line is pending. read/only until reply. | R (Optional: RR) Line is pending read/only until reply. | R (RRWB) Write back state and notify directory. | N/A Need to release first. | NA Redundant. |
| RR | I (Optional: RRR) Notify directory. | N/A | N/A | N/A | I (Optional: RRR) Notify directory. |
| I | N/A | I (ack) Invalidate line and acknowledge. | N/A | N/A | N/A |
| WB | N/A | N/A | I (WB) Write back current state of line. | N/A | N/A |

The different types of requests that are transmitted to the global directory as a result of a state transition are described in Table 2.

TABLE 2

| RS | Request shared - request current state of line and for cache to be added to list of sharers. |
|---|---|
| RM | Request modified - request current state of line and for this cache to be the exclusive owner of the line. |
| E | Eviction notice - remove current cache from list of sharers. |
| WB | Write back - write back state of line to memory and remove owner if line was in M state. |
| RP | Request private - set directory state of line to private and request current state of line (not needed if in S, M, or R - could have separate RP and RPF). |
| RRP | Request release private - mark directory state idle. |
| RR | Request read-only - set directory state to read-only, return current state of line (not needed if in S or M - could have separate RR and RRF). |
| RRWB | Request read-only and write back - writes back current state of line and sets directory state to read-only (no need to return current state of line). |
| RRR | Request release read-only - sets directory state to idle (from R). |

As previously described above, the global directory 406 tracks the states of the different cache lines across the multiple cache units 410. The states tracked by the global directory are invalid (I), shared (S), modified (M), private (P) and read-only (R). In addition, the global directory 406 performs state transitions in response to receiving requests from cache controllers 508, where the requests include any of the 5 requests listed above in Table 2. Table 3 describes the state transitions that are performed within the global directory 406 in response to the different requests listed in Table 2. In some scenarios, a state transition necessitates the transmission of one or more requests to the cache controllers 508. The request transmitted at a state transition is indicated in Table 3 below in brackets.

TABLE 3

| Re-quest | Current State | | | | |
|---|---|---|---|---|---|
| | I | S | M | P | R |
| RS | S (PS) Add sharer and reply with current state of line | S (PS) Add sharer and reply with current state of line | PWB (PWB, PS) Add sharer and forward request to owner of line - line is PWB until WB from owner, then it goes S | N/A Not allowed | R (PR) Reply with current state of line with PR (reply read-only) message - sets cache state to R on receipt |
| RM | M (PM) Add owner and reply with current state of line | PM (I, PM) Add owner, send invalidates to all sharers of line. Line is PM until all invalidates acknowledged, then M. | PM (RWB, PM) Add pending owner, send invalidate to current owner. Line is PM until write back received, then M | N/A Not allowed | N/A Not allowed |
| E | N/A | S/I Remove sharer - go to I if list empty | N/A | N/A | Ignore |
| WB | N/A | N/A | I Write back state and remove owner. | P Write back state. Line remains private until released. | N/A |
| RP | P (PP) Add owner, send reply with current state of line | PP (I) Add owner, send invalidates to all sharers. Line is PP until all acks received, then P. | PP (RWB, PP) Add pending owner, send invalidate to current owner, line is PP until WB received, then P | N/A | N/A |
| RRP | N/A | N/A | N/A | I Write back state. Line goes idle. | N/A |
| RR | R (PR) No sharer logged, reply with | R (PR) Line goes read-only, no need to | PR (RWB, PR) Forward request to current owner. Line is PR | N/A | R (PR) Reply with current state |

TABLE 3-continued

| Re-quest | Current State | | | | |
|---|---|---|---|---|---|
| | I | S | M | P | R |
| | current state of line | invalidate sharers. Evictions will be ignored. Reply with current state of line | until WB from owner, then R. | | of line. |
| RRR | N/A | N/A | N/A | N/A | I Line becomes idle. |

The different types of requests that are transmitted from the global directory 406 to the cache unit(s) 410 as a result of a state transition are described in Table 4.

TABLE 4

| PS | Reply shared with current state of line. Cache installs line and goes to S state. |
| PM | Reply modified with current state of line. Cache installs line and goes to M state. |
| PR | Reply read-only with current state of line. Cache installs line and goes to R state. |
| I | Invalidate. Cache invalidates line and sends acknowledgement (ack). |
| RWB | Request write back. Cache invalidates line and sends write back. |
| PP | Reply private with current state of line. Cache installs line and goes to P state. |

Figure 6:
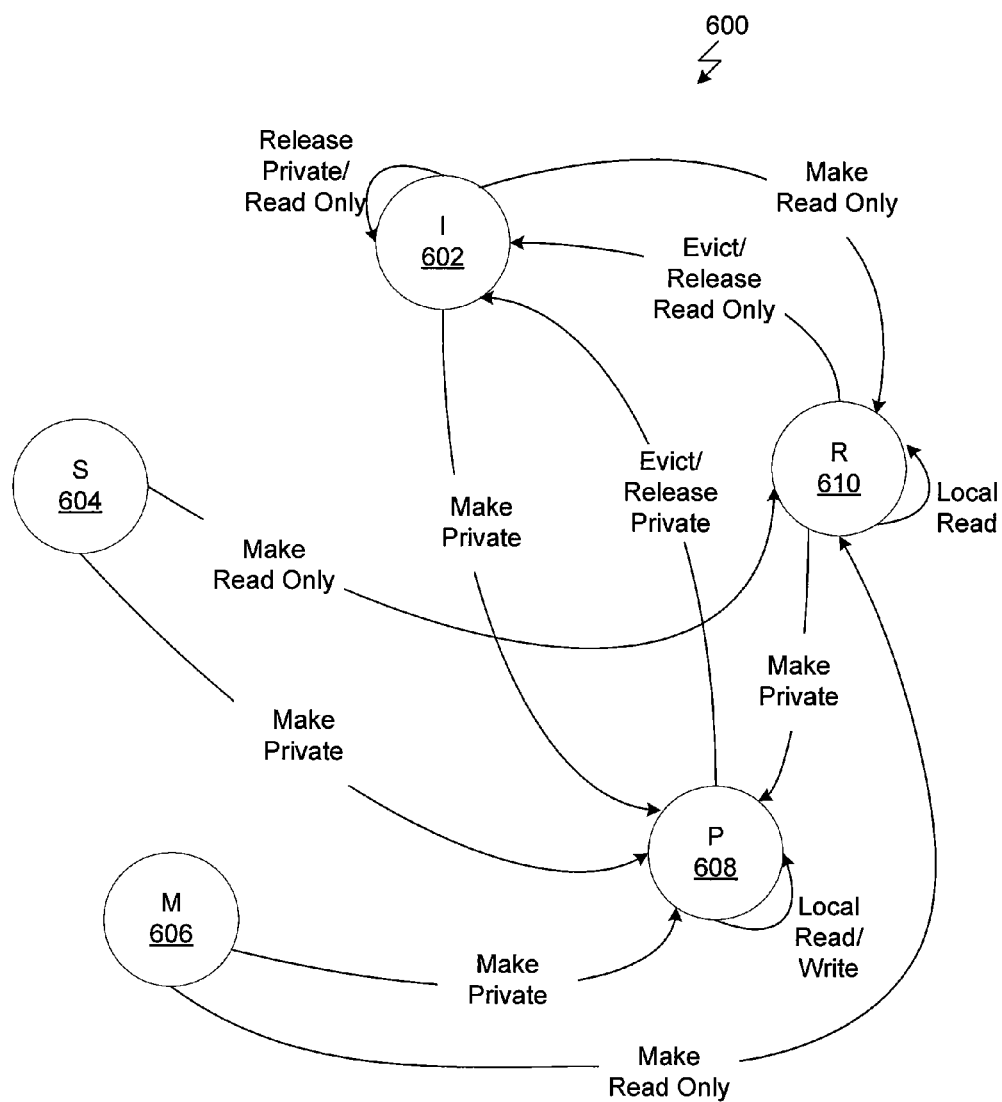
FIG. 6 is a state transition diagram that illustrates the transitions to/from explicit control states implemented by the cache controller of FIG. 5, according to one embodiment of the invention.

FIG. 6 is a state transition diagram 600 that illustrates the transitions to/from explicit control states implemented by a cache controller 508, according to one embodiment of the invention. The cache controller 508 uses the state transition diagram 600 when transitioning the state corresponding to a cache line to/from an explicit control state. Explicit control states include the private and read only states described above. The cache controller 508 also uses the state transition diagram 600 to allow or disallow certain types of read/write operations based on the state corresponding to a cache line.

As shown, a cache line can be in five different states, invalid (I) 602, shared (S) 604, modified (M) 606, private (P) 608 and read-only (R) 610. Based on an instruction received from a software program executing within the processing engine 402, a cache line corresponding to one of the states I 602, S 604, M 606 and R 610 can legally transition to P 608. Similarly, based on an instruction received from the software program, a cache line corresponding to one of the states I 602, S 604 and M 606 can legally transition to R 610. Further, based on a release instruction received from a software program executing within the processing engine 402, a cache line corresponding to one of the states P 608 or R 610 can legally transition to I 602, thereby releasing the cache line from the explicit control state.

In one embodiment, before transitioning to P 608 or R 610, the cache controller 508 transmits a RP or RR to the global directory 406 and only transitions to P 608 or R 610 when a response from the global directory 406 is received. Also, in such an embodiment, when transitioning from P 608 or R 610, the cache controller 508 notifies the global directory 406 of the release of the cache line from the explicit control state.

Persons skilled in the art would readily recognize that a cache line can also transition between the I 602, S 604 and M 606 states, as described in Tables 1 and 3. These transitions are not shown in the state transition diagram 600.

Figure 7:
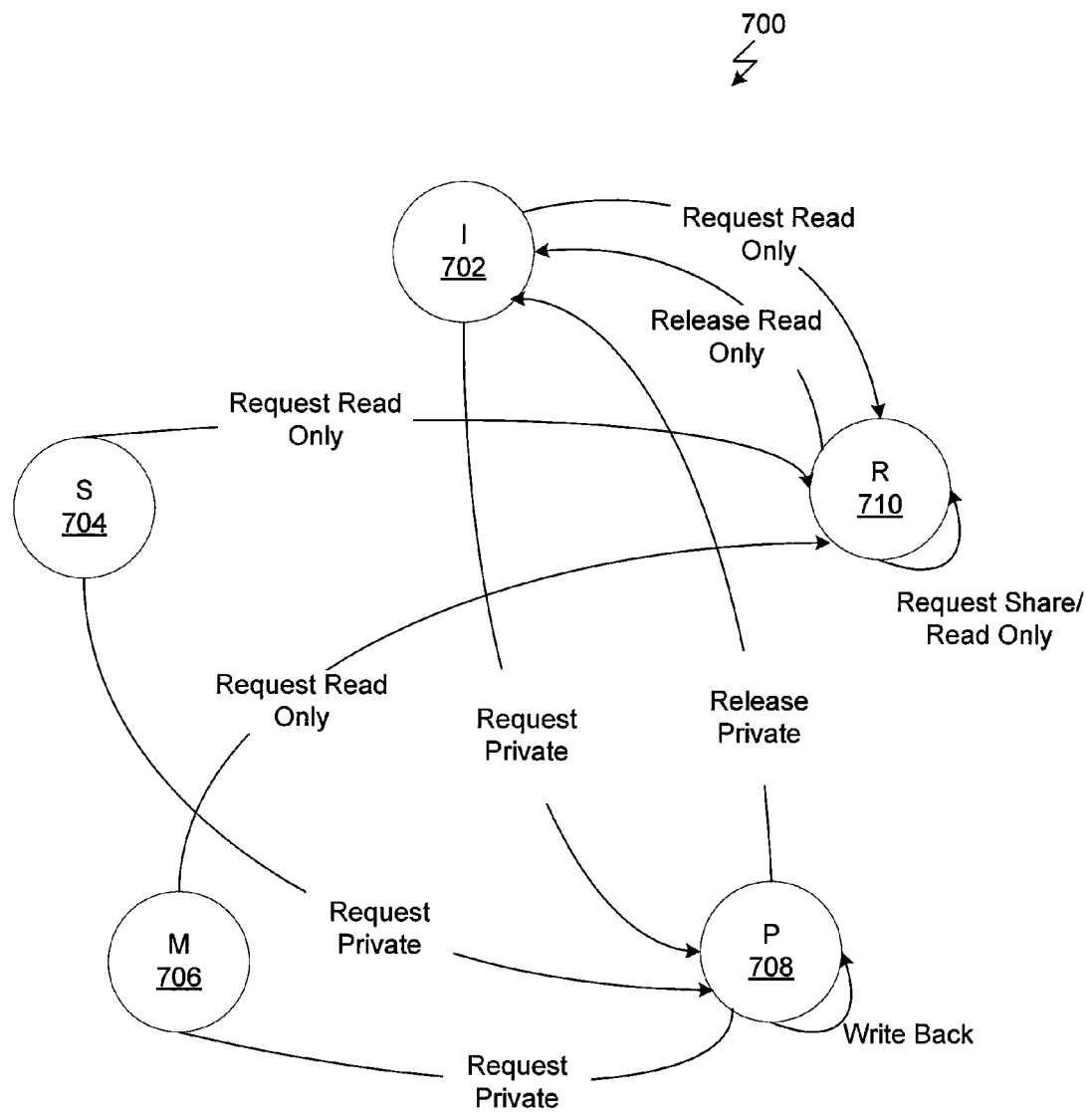
FIG. 7 is a state transition diagram that illustrates the transitions to/from explicit control states implemented by the global directory of FIG. 4, according to one embodiment of the invention.

FIG. 7 is a state transition diagram 700 that illustrates the transitions to/from explicit control states implemented by the global directory 406, according to one embodiment of the invention. The global directory 406 uses the state transition diagram 700 when transitioning the state corresponding to a cache line to/from an explicit control state.

Based on a RP request received from a cache controller 508, a cache line corresponding to one of the states I 702, S 704 and M 706 can legally transition to P 708. Similarly, on an RR request received from a cache controller 508, a cache line corresponding to one of the states I 702, S 704 and M 706 can legally transition to R 710. Further, based on a RRP request received from a cache controller 508, a cache line corresponding to the state P 708 can legally transition to I 702, thereby releasing the cache line from the explicit control state. Based on a RRR request received from a cache controller 508, a cache line corresponding to the state R 710 can legally transition to I 702, thereby releasing the cache line from the explicit control state.

Persons skilled in the art would readily recognize that a cache line can also transition between the I 702, S 704 and M 706 states, as described in Tables 1 and 3. These transitions are not shown in the state transition diagram 700.

Figure 8A:
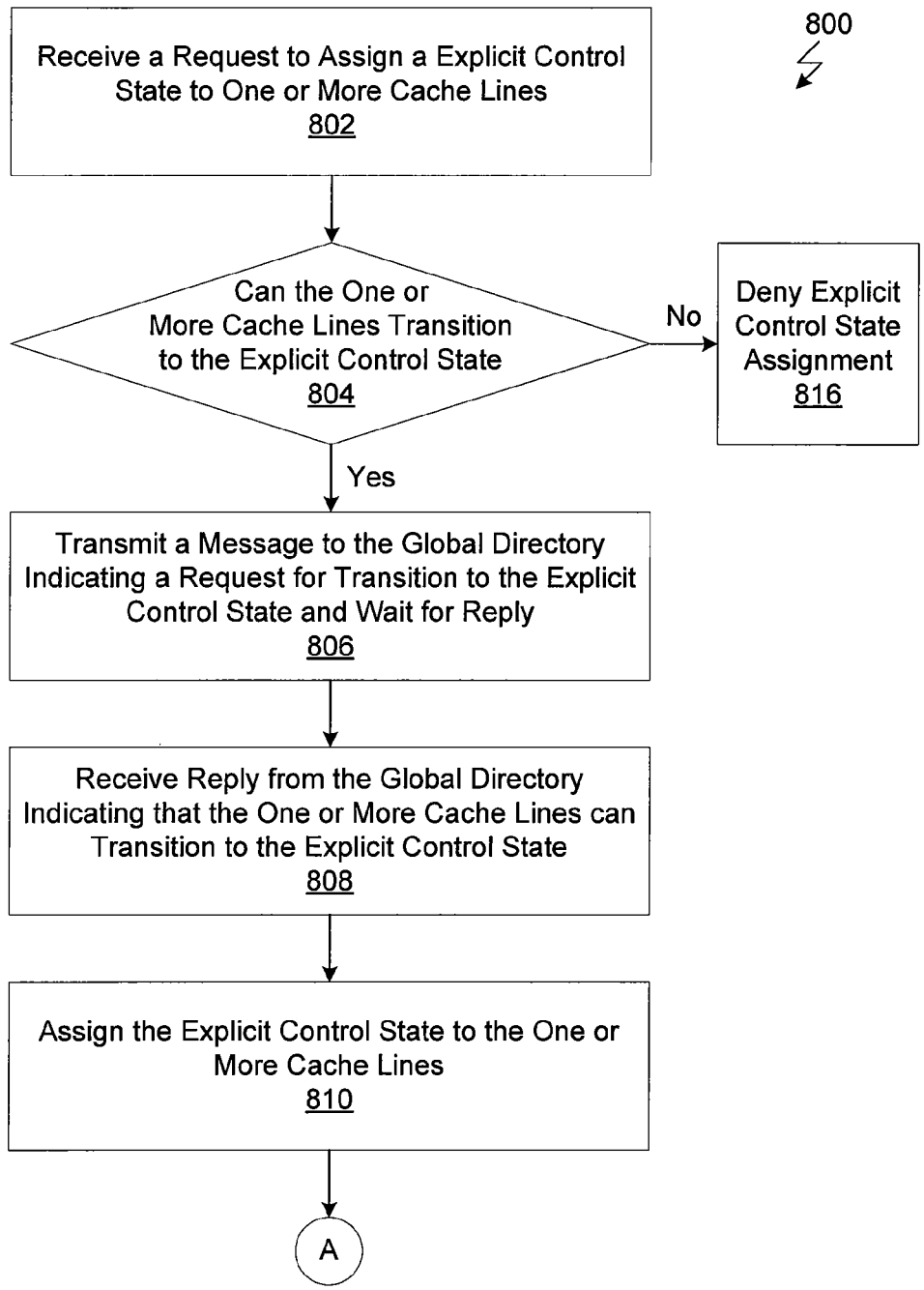
FIGS. 8A and 8B set forth a flow diagram of method steps for transitioning the state corresponding to one or more cache lines to an explicit control state, according to one embodiment of the invention.
Figure 8B:
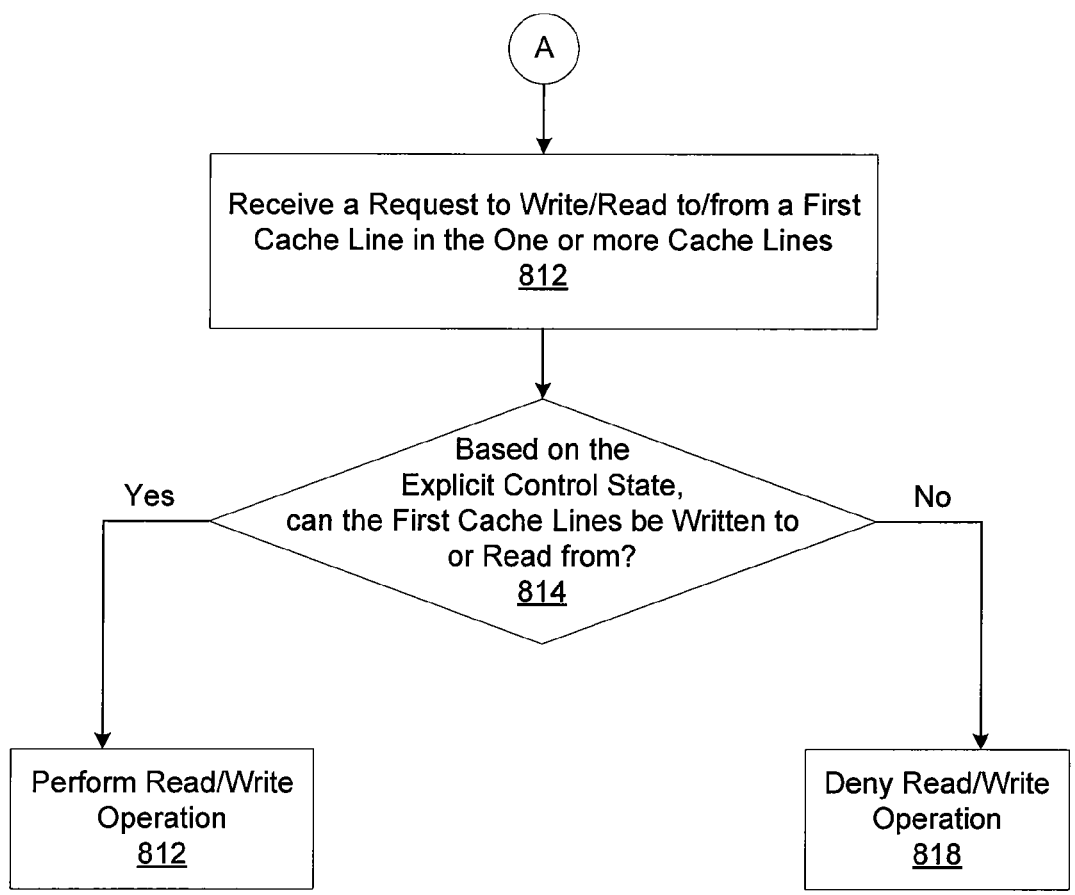

FIGS. 8A and 8B set forth a flow diagram of method steps for transitioning the state corresponding to one or more cache lines to an explicit control state, according to one embodiment of the invention. Although the method steps are described in conjunction with FIGS. 1-4, persons skilled in the art will understand that any system configured to perform the method steps, in any order, falls within the scope of the present invention.

The method 800 begins at step 802, where the cache controller 508 receives a request to transition a state corresponding to one or more cache lines to an explicit control state. An explicit control state includes a private state or a read-only state previously described herein.

At step 804, the cache controller 508 determines, based on the current state corresponding to the one or more cache lines and the legal state transitions specified in FIG. 6, whether the one or more cache lines can transition to the explicit control state. If not, then the method 800 proceeds to step 816, where the request is denied. If so, then the method proceeds to step 806.

At step 806, the cache controller 508 transmits a message to the global directory 406 indicating the request to transition the one or more cache lines to the explicit control state. The cache controller 508 then waits for a reply from the global directory 406 and until a reply is received transitions the one or more cache lines to a pending explicit control state. At step 808, the cache controller 508 receives a reply from the global directory 406 indicating that the one or more cache lines can safely transition to the explicit control state.

At step 810, the cache controller 508 assigns the requested explicit control state to the one or more cache lines. At step 812, the cache controller 508 receives a request to perform a read or write operation from/to a first cache line in the one or more cache lines. At step 814, the cache controller 508 determines whether the explicit control state assigned to the first cache line allows the read or write operation to be performed. If the explicit control state is a read-only state, then only read operations can be performed. If the explicit control state is a private state, then only local read or write operations can be performed.

If the explicit control state assigned to the first cache line allows the read or write operation to be performed, then the read/write operation is performed at step 816. However, if the explicit control state assigned to the first cache line does not allow the read or write operation to be performed, then the read/write operation is denied at step 818.

Advantageously, when the one or more cache lines are in the explicit control state, the global directory does not track any memory accesses (read or write, depending on the type of explicit control state) that are performed on the cache lines. Thus, allowing elements to be in an explicit control state—a read only or a private state—reduces the amount of invalidate and acknowledge messages that are needed to maintain coherency in a multi-processor caching environment. Such a reduction increases the overall performance of the system and reduces the complexity of the cache coherence protocol Although the method steps are described in conjunction with the systems of FIGS. 1, 2, 3A, 3B, 3C and 4, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for implementing cache coherency across a plurality of cache units coupled to a random access memory unit, the method comprising:
    receiving a request for setting a state corresponding to one or more cache lines in a set of cache lines to an explicit control state;
    transmitting a message to a global directory associated with the plurality of cache units, the message requesting a transition to the explicit control state; and
    upon receiving a reply from the global directory, setting the state corresponding to the one or more cache lines to the explicit control state, wherein, when the state corresponding to a first cache line in the one or more cache lines is set to an explicit control state, only a pre-determined set of memory access operations can be performed on the first cache line and any memory access operations performed on the first cache line are not tracked by the global directory.

2. The method of claim 1, wherein the explicit control state comprises a private state, and, when the first cache line is associated with the private state, the first cache line can only be accessed by a first cache unit.

3. The method of claim 1, wherein setting the state corresponding to the one or more cache lines to the explicit control state comprises transmitting an invalidation request to a second cache unit that shares the first cache line in the set of cache lines, and wherein, in response to the invalidation request, the second cache unit sets a local state corresponding to the first cache line to invalid.

4. The method of claim 1, wherein the reply from the global directory indicates that the one or more cache lines may safely transition to the explicit control state.

5. The method of claim 1, wherein the explicit control state comprises a read-only state, and, when the first cache line is associated with the read-only state the first cache line can be read by the plurality of cache units.

6. The method of claim 1, further comprising setting the state corresponding to the one or more cache lines to an invalid state based on receiving a release instruction.

7. The method of claim 1, wherein a region register indicates that a memory operation associated with a range of addresses should cause the cache lines associated with the range of addresses to be requested in the explicit control state.

8. A cache controller for implementing cache coherency across a plurality of cache units coupled to a direct random access memory unit, the cache controller configured to:
 receive a request for setting a state corresponding to one or more cache lines in a set of cache lines to an explicit control state;
 transmitting a message to a global directory associated with the plurality of cache units, the message requesting a transition to the explicit control state; and
 upon receiving a reply from the global directory, set the state corresponding to every cache line included in the one or more cache lines to the explicit control state, wherein, when the state corresponding to a first cache line in the one or more cache lines is set to an explicit control state, only a pre-determined set of memory access operations can be performed on the first cache line and any memory access operations performed on the first cache line are not tracked by the global directory.

9. The cache controller of claim 8, wherein the explicit control state comprises a private state, and, when the first cache line is associated with the private state, the first cache line can only be accessed by a first cache unit.

10. The cache controller of claim 8, wherein setting the state corresponding to the one or more cache lines to the explicit control state comprises transmitting an invalidation request to a second cache unit that shares the first cache line in the set of cache lines, and wherein, in response to the invalidation request, the second cache unit sets a local state corresponding to the first cache line to invalid.

11. The cache controller of claim 8, wherein the reply from the global directory indicates that the one or more cache lines may safely transition to the explicit control state.

12. The cache controller of claim 8, wherein the explicit control state comprises a read-only state, and, when the first cache line is associated with the read-only state, the first cache line can only be read by the plurality of cache units.

13. The cache controller of claim 8, further configured to set the state corresponding to the one or more cache lines to an invalid state based on receiving a release instruction.

14. The cache controller of claim 8, wherein a region register indicates that a memory operation associated with a range of addresses should cause the cache lines associated with the range of addresses to be requested in the explicit control state.

15. A computer system, comprising:
 a plurality of processing engines, each coupled to a different cache unit in a plurality of cache units;
 an off-chip memory coupled to the plurality of cache units; and
 a cache controller configured to implement cache coherency across the plurality of cache units, the cache controller configured to:
  receive a request for setting a state corresponding to one or more cache lines in a set of cache lines to an explicit control state;
  transmit a message to a global directory associated with the plurality of cache units, the message requesting a transition to the explicit control state; and
  upon receiving a reply from the global directory, set the state corresponding to every cache line included in the one or more cache lines to the explicit control state, wherein, when the state corresponding to a first cache line in the one or more cache lines is set to an explicit control state, only a pre-determined set of memory access operations can be performed on the first cache line and any memory access operations performed on the first cache line are not tracked by the global directory.

16. The computer system of claim 15, wherein the explicit control state comprises a private state, and, when the first cache line is associated with the private state, the first cache line can only be accessed by a first cache unit.

17. The computer system of claim 15, wherein the explicit control state comprises a read-only state, and, when the first cache line is associated with the read-only state, the first cache line can only be read by the plurality of cache units.

18. The computer system of claim 15, wherein a region register indicates that a memory operation associated with a range of addresses should cause the cache lines associated with the range of addresses to be requested in the explicit control state.

* * * * *